US012194970B2

(12) United States Patent
Gronau et al.

(10) Patent No.: US 12,194,970 B2
(45) Date of Patent: Jan. 14, 2025

(54) METHOD FOR REGULATING THE PRESSURE POSITION IN A BRAKING SYSTEM

(71) Applicant: Continental Automotive Technologies GmbH, Hannover (DE)

(72) Inventors: Ralph Gronau, Wetter (DE); Jusuf Muratoski, Mühlheim a.M. (DE); Alexander Bauer, Ingelheim (DE); Jurij Schmidt, Mühltal (DE)

(73) Assignee: Continental Automotive Technologies GmbH, Hannover (DE)

( * ) Notice: Subject to any disclaimer, the term of this patent is extended or adjusted under 35 U.S.C. 154(b) by 245 days.

(21) Appl. No.: 17/925,432

(22) PCT Filed: May 12, 2021

(86) PCT No.: PCT/DE2021/200066
§ 371 (c)(1),
(2) Date: Nov. 15, 2022

(87) PCT Pub. No.: WO2021/228335
PCT Pub. Date: Nov. 18, 2021

(65) Prior Publication Data
US 2023/0192054 A1     Jun. 22, 2023

(30) Foreign Application Priority Data
May 15, 2020 (DE) .................... 10 2020 206 177.7

(51) Int. Cl.
*B60T 13/68* (2006.01)
*B60T 8/172* (2006.01)
*B60T 17/22* (2006.01)

(52) U.S. Cl.
CPC ............ *B60T 13/686* (2013.01); *B60T 8/172* (2013.01); *B60T 17/22* (2013.01)

(58) Field of Classification Search
CPC ........ B60T 13/686; B60T 8/172; B60T 17/22; B60Y 2400/81; B60Y 2400/104
(Continued)

(56) References Cited

U.S. PATENT DOCUMENTS

| 2011/0153177 A1 | 6/2011 | Mahlenbrey |
| 2012/0319466 A1 | 12/2012 | Bunk |

(Continued)

FOREIGN PATENT DOCUMENTS

| DE | 102008040534 A1 | 1/2010 |
| DE | 102009047335 A1 | 6/2011 |

OTHER PUBLICATIONS

German Search Report dated Jan. 11, 2021 for the counterpart German Patent Application No. 10 2020 206 177.7.
(Continued)

*Primary Examiner* — Hai H Huynh

(57) ABSTRACT

A method for regulating a pressure setting in a braking system includes receiving a pressure demand and determining a pressure demand gradient from the pressure demand, determining a volume flow requirement from the pressure demand gradient, generating a hydraulic pressure by utilizing a pressure application device, determining an actual volume flow of the pressure application device, regulating an overflow valve on the basis of the pressure demand and the difference between the actual volume flow and the volume flow requirement. A special mode is activated when the pressure demand gradient exceeds a gradient limit value, a minimum value for the volume flow requirement being set in the special mode on the basis of a last maximum of the volume flow requirement. The special mode is deactivated when a difference between the pressure demand and a system pressure falls below a first limit value.

10 Claims, 3 Drawing Sheets

(58) Field of Classification Search
USPC .............................................. 701/70, 78, 83
See application file for complete search history.

(56) References Cited

U.S. PATENT DOCUMENTS

2020/0010059 A1   1/2020  Busse
2023/0192054 A1   6/2023  Gronau et al.

OTHER PUBLICATIONS

The International Search Report and the Written Opinion of the International Searching Authority mailed on Aug. 31, 2021 for the counterpart PCT Application No. PCT/DE2021/20066.
Office Action dated Jun. 14, 2024 of the counterpart Korean application No. 10-2022-7037049.

METHOD FOR REGULATING THE PRESSURE POSITION IN A BRAKING SYSTEM

CROSS-REFERENCE TO RELATED APPLICATIONS

The present application is a National Stage Application under 35 U.S.C. § 371 of International Patent Application No. PCT/DE2021/200066 filed on May 12, 2021 and claims priority from German Patent Application No. 10 2020 206 177.7 filed on May 15, 2020, in the German Patent and Trademark Office, the disclosures of which are herein incorporated by reference in their entireties.

TECHNICAL FIELD

The technical field relates to a method for regulating a pressure setting in a braking system.

BACKGROUND

In the case of known regulations for the pressure setting in a braking system, the actuation of a pump for driver-independent pressure build-up for comfort functions and continuous, short pressure build-ups is carried out solely on the basis of the pressure demand gradient. Such a regulation has advantages in the event of slow pressure demands, but has problems in the event of rapid, high pressure demands. In the event of such a rapid, high pressure demand, the pressure demand gradient has a very high value, which falls back to 0 very rapidly again if the pressure demand is kept constant at a constant value. One problem here is that a calculated volume flow requirement is reduced to an impermissible extent, although the target pressure has not yet been reached. Another problem is the calculation of the overflow volume via the overflow valve, which results from the volume flow of the pressure application device and the volume flow requirement. In the event of an overflow volume that does not physically exist but is incorrectly used for the calculation, correction values that are too high are calculated for the electrical valve current, and the actuating accuracy of the overflow valve is thus significantly worsened.

It is therefore an object to specify a regulation for the pressure settings in a braking system, which ensures that the pressure demand is reached rapidly and precisely, even in the event of rapid, high pressure demands.

SUMMARY

The object may be achieved by a method in which a pressure demand is received by a control unit for the pressure setting and in particular for regulating the overflow valve, for example from an ESC control unit, and a pressure demand gradient is determined from the pressure demand. For this purpose, the pressure demand can be derived in terms of time and optionally filtering and smoothing measures can be carried out. A volume flow requirement is determined from the pressure demand gradient. For this purpose, a corresponding characteristic curve or a conversion variable, such as a multiplication factor, can be stored in the control unit. The pressure application device is actuated to build up a hydraulic pressure to generate a volume flow. The pressure application device can comprise a hydraulic pump that is activated in order to generate a volume flow of the hydraulic fluid of the braking system. Since the pressure application device generally cannot be regulated with very high precision, the volume flow actually provided by it does not correspond exactly to the demand, and therefore the actual volume flow of the pressure application device is determined. A volume flow may also be demanded that is greater than the calculated volume flow requirement. In addition, an electrical valve current for the overflow valve is calculated and made available to the latter. The electrical valve current depends firstly on the required differential pressure across the overflow valve and thus on the pressure demand. In addition, the valve flow has to be adapted to the overflow volume through the overflow valve, since the Venturi effect causes forces to act on a valve tappet in the overflow valve and move said valve tappet. The overflow valve is therefore regulated on the basis of the pressure demand and the difference between the actual volume flow and the volume flow requirement.

In order to be able to react specifically to a rapid, high pressure demand, the pressure demand gradient is monitored to determine whether it exceeds a gradient limit value. In this case, a special mode is activated, wherein the special mode predefines a minimum value for the volume flow requirement, below which the value cannot fall. That is to say, if a value for the volume flow requirement that is less than the minimum value is calculated, the volume flow requirement is set to the minimum value. The minimum value is calculated on the basis of a last maximum of the volume flow requirement. For this purpose, if the gradient limit value is exceeded, the greatest volume flow requirement that occurs can be stored as a maximum value.

The special mode is deactivated again when a difference between the pressure demand and a system pressure falls below a first limit value, i.e. when the hydraulic pressure in the system has reached the pressure demand up to a predefined difference.

In one embodiment, the system pressure is determined from a vehicle-specific model calculation. In this way, it is possible to dispense with an additional pressure sensor, and costs can thus be saved.

The vehicle-specific model calculation can be based on real measurement data from the system pressure and volume consumption of the braking system.

In another embodiment, the pressure application device is actuated on the basis of the volume flow requirement. The pressure application device can be, for example, a hydraulic pump, the flow rate of which is regulated to the volume flow requirement or to a volume flow that is greater than the volume flow requirement. In addition, a predefined run-on time for the pump can also be provided.

In another embodiment, the actual volume flow is determined from a speed of the pressure application device. This is a particularly simple way of determining the actual volume flow, since the speed of the pump can be determined simply from corresponding signals or from the evaluation of the supply voltage.

In another embodiment, in the special mode, the minimum value of the volume flow requirement is set to a value between 100% and 60%, preferably 90% and 70% of the last maximum of the volume flow requirement. The continued high volume flow requirement means that the pressure demand which is received is reached particularly rapidly. However, it is not kept at the maximum value to produce an overshoot, i.e. too high a system pressure, which could result in too much braking pressure and therefore in over-braking.

In another embodiment, the pressure demand gradient is monitored for the occurrence of a maximum and, when a maximum is detected, the current volume flow requirement is used as the last maximum of the volume flow requirement. For this purpose, for example, the value of the pressure demand gradient that is greater than the limit value can be stored as a possible maximum and each new value of the pressure demand gradient can be checked to see whether it is greater. The associated volume flow requirement is calculated from the largest value. The characteristic stored in the control unit or a conversion variable, such as a multiplication factor, can again be used for this purpose. Alternatively, the pressure demand can be derived a second time to find the maximum value of the pressure demand gradient as a zero of the second derivative.

In another embodiment, when the special mode is deactivated, a switch is made to a transition mode, with the minimum value of the volume flow requirement being reduced, in particular linearly, in the transition mode. The minimum value is preferably reduced to 0. This avoids an abrupt transition and thus a possible overshooting of the system pressure above the pressure demand, since the system pressure is slowly brought up to the pressure demand by the linear reduction in the volume flow requirement. For this purpose, the minimum value can be adapted proportionally with the difference between the pressure demand and the system pressure.

In another embodiment, the first limit value is between 25 and 2 bar, preferably 12 and 4 bar, particularly preferably between 6 and 10 bar. Such a limit value regulates the system pressure particularly rapidly and precisely to the pressure demanded.

In another embodiment, the gradient limit value is greater than 100 bar/second, preferably greater than 150 bar/second, particularly preferably greater than 200 bar/second.

A hydraulic braking system having at least one hydraulic wheel brake and a pressure application device may also be realized, which is connected to the wheel brake and is designed to convey a volume flow in the direction of the at least one wheel brake, and an overflow valve which is connected to the wheel brake in such a way that a volume flow can flow away from the wheel brake via the overflow valve to adjust a hydraulic pressure at the at least one wheel brake. According to one embodiment, a control unit is provided which is designed to carry out a method described above.

BRIEF DESCRIPTION OF THE DRAWINGS

Further features, advantages and possible applications of the invention also result from the description below of exemplary embodiments and the drawings. All of the features described and/or pictorially depicted belong to the subject matter of the invention both individually and in any combination, also independently of their summarization in the claims or the back-references thereof.

DETAILED DESCRIPTION

Figure 1:
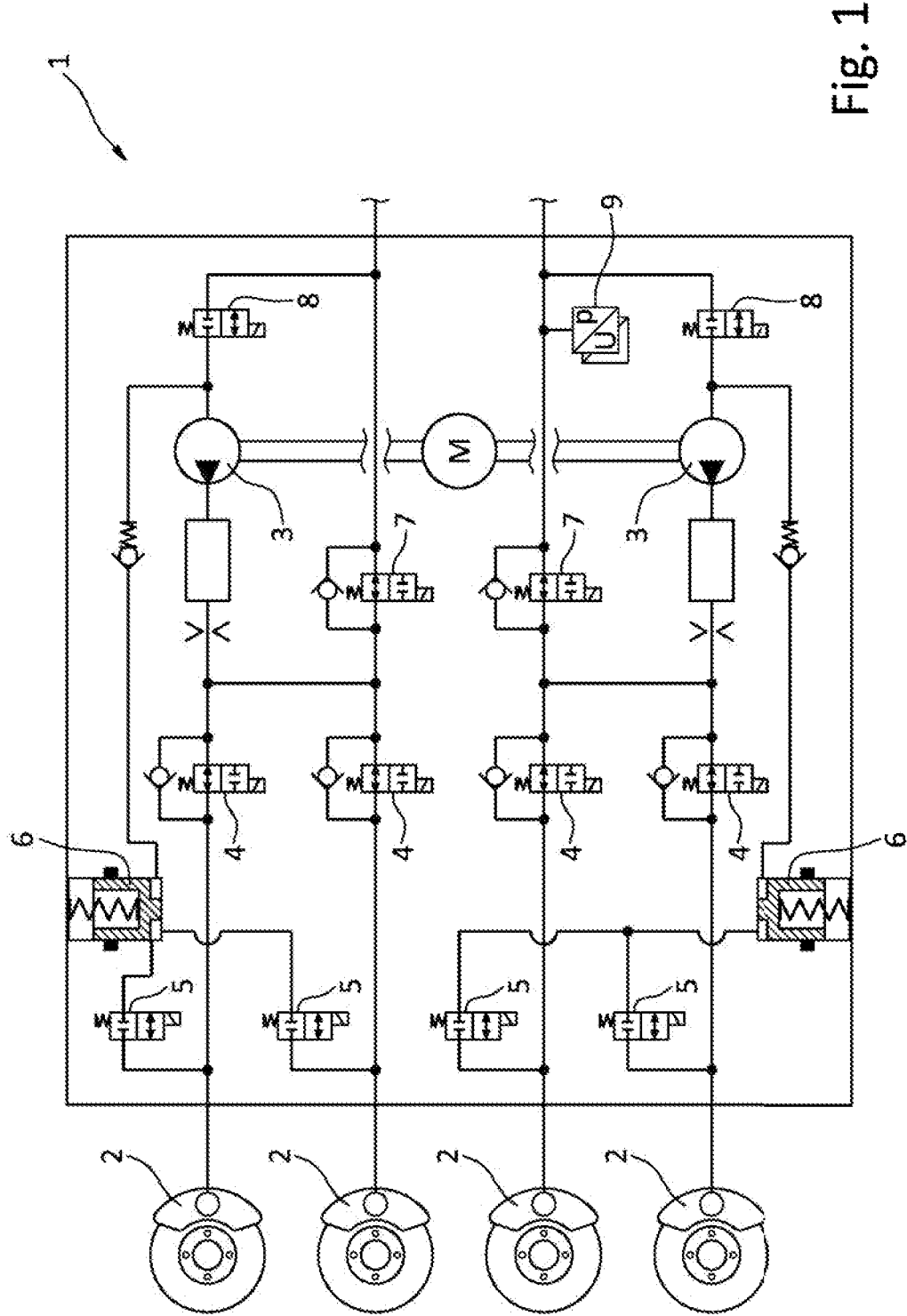
FIG. 1 schematically shows the hydraulic circuit of a braking system according to one exemplary embodiment, FIG. 2 schematically shows the method sequence according to one exemplary embodiment.

The braking system 1 shown in FIG. 1 is known in principle from the prior art. The braking system 1 has four wheel brakes 2, which in normal operation are connected to a tandem master brake cylinder (not shown) and are pressurized by the driver using a brake pedal. The braking system 1 has two substantially identical braking circuits, each of which is connected to a chamber of the tandem master brake cylinder and actuates two wheel brakes 2. In normal operation, an interposed master cylinder valve 7 (MCI) is open when deenergized and a pump valve 8 is closed. Each wheel brake 2 also has an inlet valve 4, through which hydraulic fluid can enter the wheel brakes, and an outlet valve 5, through which the hydraulic fluid can be drained from the wheel brakes 2 into a low-pressure accumulator 6.

In order to build up braking pressure in the wheel brakes 2 independently of the driver, the pump valve 8 can be opened and the hydraulic pump 3 can be activated in order to pump hydraulic fluid through the inlet valves 4 into the wheel brakes 2.

Since the pressure in the wheel brakes 2 cannot be regulated with very great precision by means of a hydraulic pump 3, the master cylinder valve 7 is not completely closed but instead is used as an overflow valve 7. For this purpose, slightly more hydraulic fluid is pumped in the direction of the wheel brakes 2 by means of the hydraulic pump 3 than is required there to build up a braking pressure demanded. The excess volume is discharged as an overflow volume through the overflow valve 7. For this purpose, the overflow valve 7 is set to the required braking pressure in the wheel brakes 2 in order to precisely regulate the braking pressure. The electrical valve current required depends here on the differential pressure to be set across the overflow valve 7. Since the side of the overflow valve 7 that is connected to the master brake cylinder is substantially free from pressure when braking pressure builds up independently of the driver, the differential pressure across the overflow valve 7 corresponds to the pressure of the wheel brakes. The electrical valve current required for the overflow valve 7 also depends on the overflow volume via the overflow valve 7.

Figure 2:
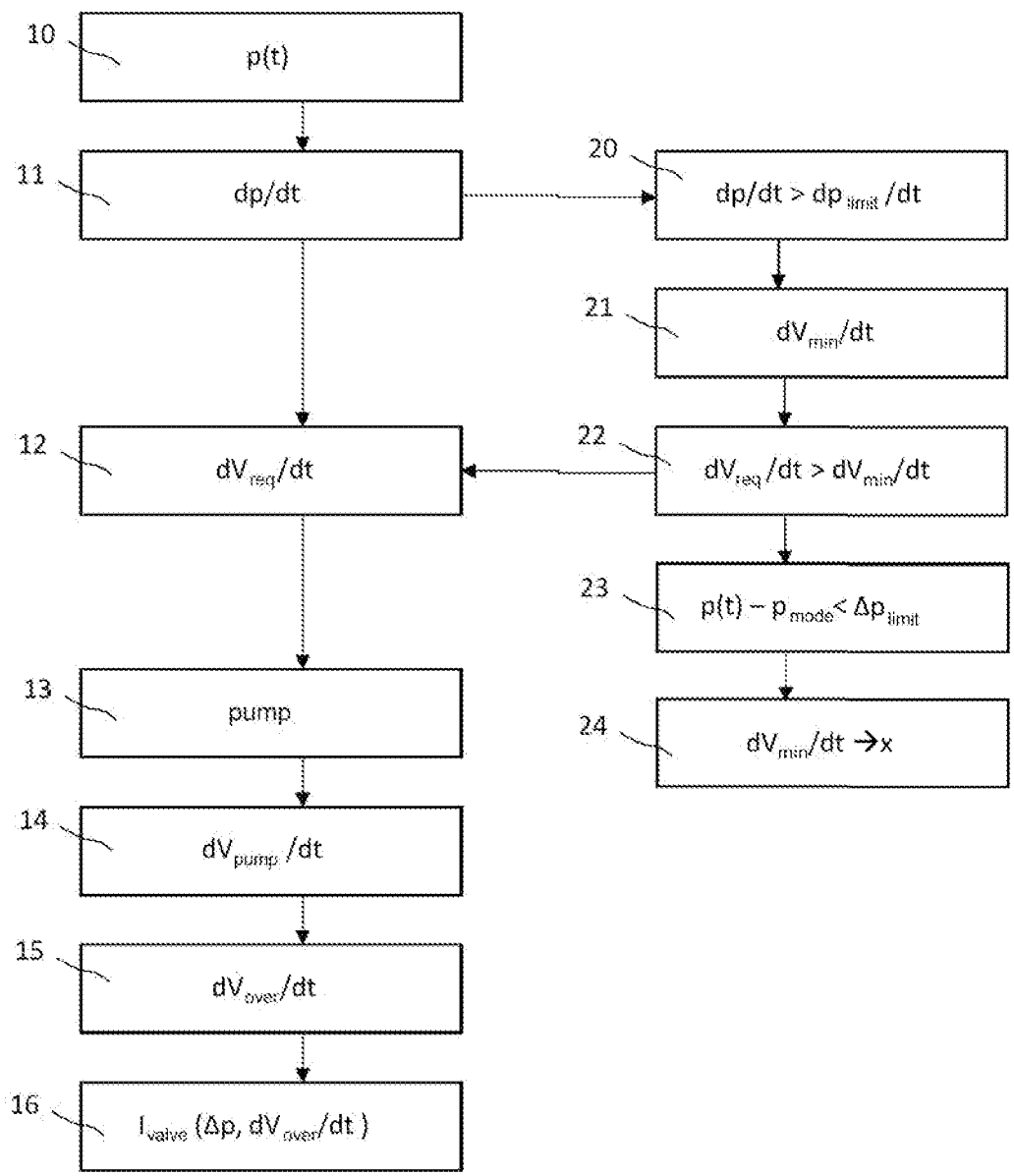

FIG. 2 now shows the method sequence in simplified form. In a step 10, a pressure demand p(t), for example from an ESC control unit, is received. In a step 11, a pressure demand gradient $$\frac{dp}{dt}$$

is determined by derivation from the pressure demand p(t). In addition, filters and smoothing measures can also be carried out.

For sufficiently slow changes in the pressure demand p(t), in a step 12, a volume flow requirement $$\frac{dp}{dt}$$

is determined from the pressure demand gradient $$\frac{dV}{dt}_{req}$$

by the pressure demand gradient $$\frac{dp}{dt}$$

being multiplied with a vehicle-specific value $$\frac{dV}{dp}$$

for the relationship between change in pressure and change in volume.

$$\frac{dV}{dt_{req}} = \frac{dp}{dt} \cdot \frac{dV}{dp}$$

In a step 13, the hydraulic pump 3 is activated and operated at a speed that results in a volume flow of the hydraulic pump 3 that is greater than the calculated volume flow requirement $$\frac{dV}{dt_{req}}$$

by a predefinable value.

In a step 14, the actual volume flow $$\frac{dV}{dt_{pump}}$$

of the hydraulic pump 3 is determined. For this purpose, the speed of the hydraulic pump 3 is determined and the volume flow $$\frac{dV}{dt_{pump}}$$

is determined from a characteristic of the hydraulic pump 3.

The required overflow volume $$\frac{dV}{dt_{over}}$$

across the overflow valve 7 is determined, in a step 15, from the actual volume flow $$\frac{dV}{dt_{pump}}$$

of the hydraulic pump 3 and the volume flow requirement $$\frac{dV}{dt_{req}}.$$

$$\frac{dV}{dt}_{over} = \frac{dV}{dt}_{pump} - \frac{dV}{dt}_{req}$$

In step 16, a characteristic of the overflow valve 7 with the pressure demand p(t) as the pressure difference Δp and the determined overflow volume $$\frac{dv}{dt}_{over}$$

determines the required electrical valve current and supplies the overflow valve 7 with said electrical current.

In order to reach the pressure demanded rapidly and safely even in the event of rapid, high pressure demands, that is to say, when the pressure demand p(t) rises rapidly, in particular in stages, provision is furthermore made, as shown in step 20, to monitor the pressure demand gradient $$\frac{dp}{dt}$$

to ascertain whether the latter exceeds a predefined limit value $$\frac{dp}{dt}_{limit}.$$

If this is the case, a special mode is activated and, in step 21, a maximum volume flow requirement $$\frac{dV}{dt}_{max}$$

is determined. For this purpose, the maximum volume flow requirement can be calculated in particular from the maximum of the pressure demand gradient $$\frac{dp}{dt}$$

using the vehicle-specific value.

$$\frac{dV}{dt}_{max} = \frac{dp}{dt}_{max} \cdot \frac{dV}{dp}$$

From the maximum volume flow requirement $$\frac{dV}{dt}_{max},$$

a minimium value $$\frac{dV}{dt}_{min}$$

is specified for the volume flow, which in the illustrated embodiment is selected to be 20% smaller than the maximum volume flow requirement $$\frac{dV}{dt}_{max}.$$

$$\frac{dV}{dt}_{min} = 0.8 \cdot \frac{dV}{dt}_{max}$$

While the special mode is activated, the volume flow requirement $$\frac{dV}{dt}_{req}$$

cannot fall below the minimum value $$\frac{dV}{dt}_{min},$$

as shown in step 22.

The special mode is ended in step 23 as soon as the difference between the pressure demand p(t) and a system pressure in the respective wheel brakes 2 falls below a corresponding limit value. As shown in FIG. 1, only a single pressure sensor 9 which measures the pressure on the low-pressure side of the hydraulic pump 3 of the lower brake circuit is provided. The system pressure in the wheel brakes 2 therefore cannot be measured directly. A vehicle-specific pressure model is therefore calculated, from which the system pressure can be determined. As soon as the system pressure determined from the pressure model has approached the pressure demand p(t) to the limit value, the special mode is ended and, in step 24, there is a change into a transition mode. In the transition mode, the minimum value $$\frac{dV}{dt}_{min}$$

or the volume requirement is reduced linearly to 0.

Figure 3:
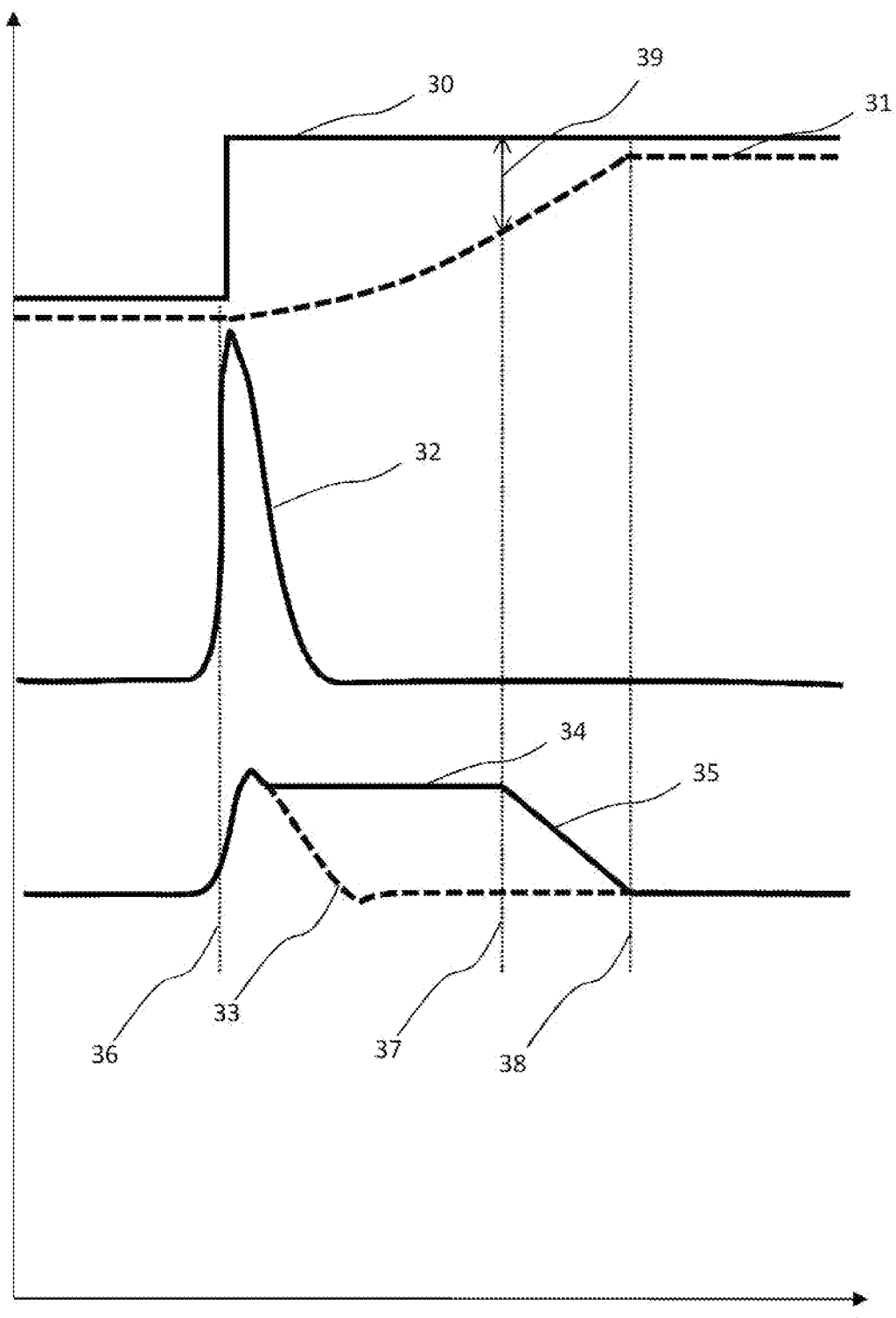
FIG. 3 shows a diagram with method data according to one exemplary embodiment.

FIG. 3 shows, by way of example, the time profile of various variables in the event of a rapid, high pressure demand (shown here as a jump). The pressure demand 30 is received as the first input variable, for example from an ESC control device. At time 36, said pressure demand has a level that changes from approximately p=0 to a constant value p>0. However, the actual system pressure cannot follow such a rapid, high pressure demand, but rather has a profile 31 that is shown with a dashed line. Since the actual system pressure cannot be measured directly, it is determined using a vehicle-specific pressure model 31.

The pressure demand gradient 32 substantially corresponds to the time derivative of the pressure demand 30, which is already provided with temporal filtering. Despite the temporal filtering, the pressure demand gradient 32 rises very rapidly to a maximum value and then drops again very steeply to 0.

The volume flow requirement 33 is calculated from the pressure demand gradient 32 by multiplying it with a vehicle-specific volume consumption $$\frac{dV}{dp}$$

which has been determined by means of a pressure/volume consumption measurement and is stored in the braking control unit. According to this calculation formula, the volume flow requirement 33 would take the course shown in dashed lines and would therefore drop to 0 just as rapidly as the pressure demand gradient 32. At the point in time at which the volume flow requirement would already have fallen back to 0, the system pressure 31 has not yet risen to the pressure 30 actually demanded, but rather has only reached a fraction of the pressure demanded. Since the volume flow requirement 33 is used as the basis for regulating the hydraulic pump 3 and the overflow valve 7, the rapid drop in the volume flow requirement 33 would thus prevent the braking pressure demanded from actually being able to be provided.

Accordingly, the special mode is started at time 36 since the pressure demand gradient 32 exceeds a limit value. For this purpose, the volume flow requirement is calculated at the time of the maximum pressure demand gradient 32 and stored as the maximum volume flow requirement. A minimum value 34 for the volume flow requirement, below which the value may not fall for the duration of the special mode, is established from said maximum volume flow requirement. Accordingly, the volume flow requirement does not correspond to the calculated dashed line profile 33, but rather remains at the minimum value 34 up to a time 37 at which the special mode is ended, since a difference 39 between the pressure demand 30 and the pressure model 31 falls below a limit value.

At the time 37 the special mode is ended and a change is made into a transition mode 35. In the transition mode 35, the minimum value of the volume flow requirement is reduced linearly to 0, and therefore at a time 38 the transition mode is also ended. At this time, the system pressure from the pressure model 31 substantially corresponds to the pressure demand 30.

The invention claimed is:

1. A method for regulating a pressure setting in a braking system, having a pressure application device and an overflow valve, comprising:
   receiving a pressure demand and determining a pressure demand gradient from the pressure demand
   determining a volume flow requirement from the pressure demand gradient
   generating a hydraulic pressure utilizing the pressure application device
   determining an actual volume flow of the pressure application device
   regulating the overflow valve on the basis of the pressure demand and the difference between the actual volume flow and the volume flow requirement, wherein
   a special mode is activated when the pressure demand gradient exceeds a gradient limit value,
   a minimum value for the volume flow requirement is set in the special mode on the basis of a last maximum of the volume flow requirement, and
   the special mode being deactivated when a difference between the pressure demand and a system pressure falls below a first limit value.

2. The method as claimed in claim 1, wherein the system pressure is determined from a vehicle-specific model calculation.

3. The method as claimed in claim 1 wherein the pressure application device is actuated on the basis of the volume flow requirement.

4. The method as claimed in claim 1, the actual volume flow is determined from a speed of the pressure application device.

5. The method as claimed in claim 1, wherein in the special mode, the minimum value of the volume flow requirement is set to a value between 90% and 70% of the last maximum of the volume flow requirement.

6. The method as claimed in claim 1, wherein the pressure demand gradient is monitored for the occurrence of a maximum and, when a maximum is detected, the current volume flow requirement is used as the last maximum of the volume flow requirement.

7. The method as claimed in claim 1, wherein when the special mode is deactivated, a switch is made to a transition mode, with the minimum value of the volume flow requirement (35) being reduced linearly in the transition mode.

8. The method as claimed in claim 1, wherein the first limit value is between 6 and 10 bar.

9. The method as claimed in claim 1, wherein the gradient limit value is greater than 200 bar/second.

10. A hydraulic braking system having at least one hydraulic wheel brake and a pressure application device, which is connected to the wheel brake and is designed to convey a volume flow in the direction of the at least one wheel brake, and an overflow valve which is connected to the wheel brake in such a way that a volume flow can flow away from the wheel brake via the overflow valve and is designed to adjust a hydraulic pressure at the at least one wheel brake, and a control unit configured to:
- receive a pressure demand and determining a pressure demand gradient from the pressure demand
- determine a volume flow requirement from the pressure demand gradient
- generate a hydraulic pressure utilizing the pressure application device
- determine an actual volume flow of the pressure application device
- regulate the overflow valve on the basis of the pressure demand and the difference between the actual volume flow and the volume flow requirement, wherein
- a special mode is activated when the pressure demand gradient exceeds a gradient limit value,
- a minimum value for the volume flow requirement is set in the special mode on the basis of a last maximum of the volume flow requirement, and
- the special mode being deactivated when a difference between the pressure demand and a system pressure falls below a first limit value.

* * * * *